(12) United States Patent
Runte et al.

(10) Patent No.: US 8,291,595 B2
(45) Date of Patent: Oct. 23, 2012

(54) METHOD FOR PRODUCTION OF A LINK ROD WITH U-SHAPED CROSS SECTION FROM SHEET METAL FOR A CAR MULTI-LINK AXLE

(75) Inventors: Klaus Runte, Tönning (DE); Ulf Sudowe, Georgsmarienhütte (DE); Matthias Kröger, Hille (DE); Udo Wächter, Wallenhorst (DE)

(73) Assignee: Thyssenkrupp Umformtechnik GmbH, Bielefeld (DE)

( * ) Notice: Subject to any disclaimer, the term of this patent is extended or adjusted under 35 U.S.C. 154(b) by 889 days.

(21) Appl. No.: 12/305,548

(22) PCT Filed: May 22, 2007

(86) PCT No.: PCT/EP2007/054955
§ 371 (c)(1),
(2), (4) Date: Mar. 18, 2009

(87) PCT Pub. No.: WO2007/147695
PCT Pub. Date: Dec. 27, 2007

(65) Prior Publication Data
US 2009/0277010 A1    Nov. 12, 2009

(30) Foreign Application Priority Data

Jun. 20, 2006 (DE) .......................... 10 2006 028 713

(51) Int. Cl.
*B21D 53/88* (2006.01)
(52) U.S. Cl. ...................................................... 29/897.2

(58) Field of Classification Search .................. 29/897.2
See application file for complete search history.

(56) References Cited

U.S. PATENT DOCUMENTS

| 1,445,850 A | 2/1923 | Schaefer ......................... 74/579 |
| 6,241,267 B1 | 6/2001 | Dziadosz et al. ...... 280/124.134 |
| 2002/0162297 A1 | 11/2002 | Graber .......................... 52/735.1 |
| 2004/0135337 A1 | 7/2004 | Alesso et al. .......... 280/124.134 |

FOREIGN PATENT DOCUMENTS

DE        1859440        10/1962
(Continued)

OTHER PUBLICATIONS

International Search Report for International Application No. PCT/EP2007/054955.

*Primary Examiner* — David Bryant
*Assistant Examiner* — Moshe Wilensky
(74) *Attorney, Agent, or Firm* — Proskauer Rose LLP

(57) ABSTRACT

A link rod with a U-shaped profile made from a one-piece sheet metal shell including two part shells and a back connecting said part shells. Bearing eyes are formed from a pair of aligned holes in the part shells. To obtain outer collars having inner bearing support surfaces for the bearing eyes with a slim-shaped construction of the link rod, the forming is performed stepwise by firstly producing the holes and bending the edges thereof to form the collars on one of the part shells which have not yet been brought parallel to each other by bending. Only then is what is to become the second part shell bent such as to be parallel to the first part shell. The holing and the bending of the edges of the holes on the second part shell is then carried out through the holes of the first part shell.

5 Claims, 3 Drawing Sheets

FOREIGN PATENT DOCUMENTS

| | | |
|---|---|---|
| DE | 3006240 | 8/1981 |
| DE | 20317345 | 1/2004 |
| DE | 10334192 | 2/2005 |
| EP | 1237740 | 9/2003 |
| JP | 62006808 | 1/1987 |
| JP | 2185813 | 7/1990 |
| JP | 8233009 | 9/1996 |
| WO | 02074562 | 9/2002 |

METHOD FOR PRODUCTION OF A LINK ROD WITH U-SHAPED CROSS SECTION FROM SHEET METAL FOR A CAR MULTI-LINK AXLE

CROSS-REFERENCE TO RELATED APPLICATIONS

This application is a National Phase Application of International Application No. PCT/EP2007/054955, filed on May 22, 2007, which claims the benefit of and priority to German patent application no. DE 10 2006 028 713.4-21, filed on Jun. 20, 2006. The disclosures of the above applications are incorporated herein by reference in their entirety.

FIELD OF THE INVENTION

The invention relates to a method for manufacturing a link rod with a U-shaped cross-section formed from a one-piece sheet metal shell for a multilink axle of a passenger car, the sheet metal shell being formed as a shaped part of two part shells in a mirror-image arrangement to each other and a back connecting said part shells, and having bearing eyes at both ends thereof which are formed each by a pair of aligned holes in the part shells, wherein the edges of said holes are provided with collars forming inner bearing support surfaces.

BACKGROUND

Different types of link rods for suspending a spring-supported wheel in a vehicle are known. It is their function to guide the wheel in its motion relative to the vehicle while driving. Therefore it is important for such link rods to have a high rigidity at low weight. Moreover, due to limited space they should have a slim build. These prerequisites are met in comparison to solid link rods mainly by link rods made of sheet metal shells.

A link rod of the above-mentioned type known from a patent document (DE 103 34 192 A1) can be formed comparatively simple by a drawing and subsequent bending process. Thus a more complex manufacturing step of welding can be omitted. However, in this link rod only plain holes are provided for bearing eyes. This means that additional means for receiving bearing bushings must be provided either in the holes or at the bushings proper. Also, its rigidity is far from optimum due to the simple apertures for the bearing eyes. It is not known if such a link rod has been used in practice.

In a known method for manufacturing a link rod of the above-mentioned type (WO 02/074562 A2) holes having inner bearing support surfaces are formed in a flat sheet metal blank. Then, in two sequential process steps, the first limb of the U-shaped profile to be produced and then the second limb of the U-shaped profile to be produced are each bent by 90° so that the back connecting both limbs is formed and both limbs are in parallel to each other. This way of manufacturing makes it difficult to exactly align the holes providing the common bearing surfaces with each other.

SUMMARY OF THE INVENTION

An aspect of the invention to provide a method for manufacturing a link rod for a multilink rear axle of a passenger car from a sheet metal blank, which method can be easily performed while providing a slim design of the link rod with integrated bearing support surfaces. In particular the manufacture of the link rod should be performed in a continuously joint fashion to a strip unwound from a coil.

In one embodiment of the invention, the method includes the following features:

The back of what is to be the U-shaped profile is formed in a sheet metal blank.

The first limb of what is to be the U-shaped profile is bent by 90°.

The bent first limb is holed at both ends and the edges of the holes are formed outward thus forming collars with inner bearing support surfaces.

The second limb of what is to be the U-shaped profile is bent so that it is in parallel to the first limb.

The bent second limb is holed at both ends and the edges of the holes are formed outward thus forming collars with inner bearing support surfaces, wherein the holing and forming tools required for this step pass through the holes in the first limb while being guided by them.

The method according to the invention is distinguished by the fact that solely by means of forming a slim-shaped link rod (small interior distance of the limbs) having bearing support surfaces with a large area is produced. Despite of the small interior distance of the limbs, due to the different manufacturing stages considering the accessibility of the limbs, the outer collars comprising the bearing support surfaces can be formed without difficulty.

Shaping of the back is performed in the first stage of the shaping preferably by deep-drawing or pressing. At the end of manufacture, the link rod should be calibrated for improving its dimensional accuracy.

It is particularly preferred if the manufacture of the link rods is performed in a "coil-dropping" manner, i.e. on a strip unwound from a coil. Even if the sheet metal part provided for the link rod remains continuously connected to the strip, the different manufacturing steps can be performed. According to one embodiment this is done as follows:

The sheet metal part is cut out of the sheet metal strip at what is to be its limbs so that only the ends of what is to be the back are connected to the sheet metal strip.

The back is formed with a U-shaped section, the limbs remaining in the plane of the sheet metal or being displaced into an orientation parallel thereto.

The first limb is bent by 90° so that it merges into the adjacent longitudinal edge of the back in an aligned manner.

The entire sheet metal part is turned by 90° in the sheet metal strip while twisting the portions connected at the ends of the back so that the bent limb is again arranged in the plane of the sheet metal strip or parallel thereto.

After holing the first limb and bending the edges of the holes, the entire sheet metal part is turned back.

The second limb is bent by 90° so that it merges into the adjacent longitudinal edge of the back in an aligned manner while being parallel to the first limb.

The entire sheet metal part is turned by 90° in the sheet metal strip while twisting the portions connected at the ends of the back so that both limbs are arranged parallel to the plane of the sheet metal strip.

Holing of the second limb is performed and then bending of the edges of the holes via the holes in the first limb.

The edges of the holes are jointly calibrated in an aligned manner.

The sheet metal part finished as a link rod is cut from the sheet metal strip at the ends of the back.

In this method the forming and the orientation of the sheet metal part with respect to the working direction is performed in an optimal manner. For the work to be performed from one side of the strip only, the directions of rotation are chosen such that the working direction is the same for all forming processes.

BRIEF DESCRIPTION OF THE DRAWINGS

The invention will be explained in detail with reference to a drawing illustrating an embodiment thereof. In the drawing.

DESCRIPTION

Figure 1:
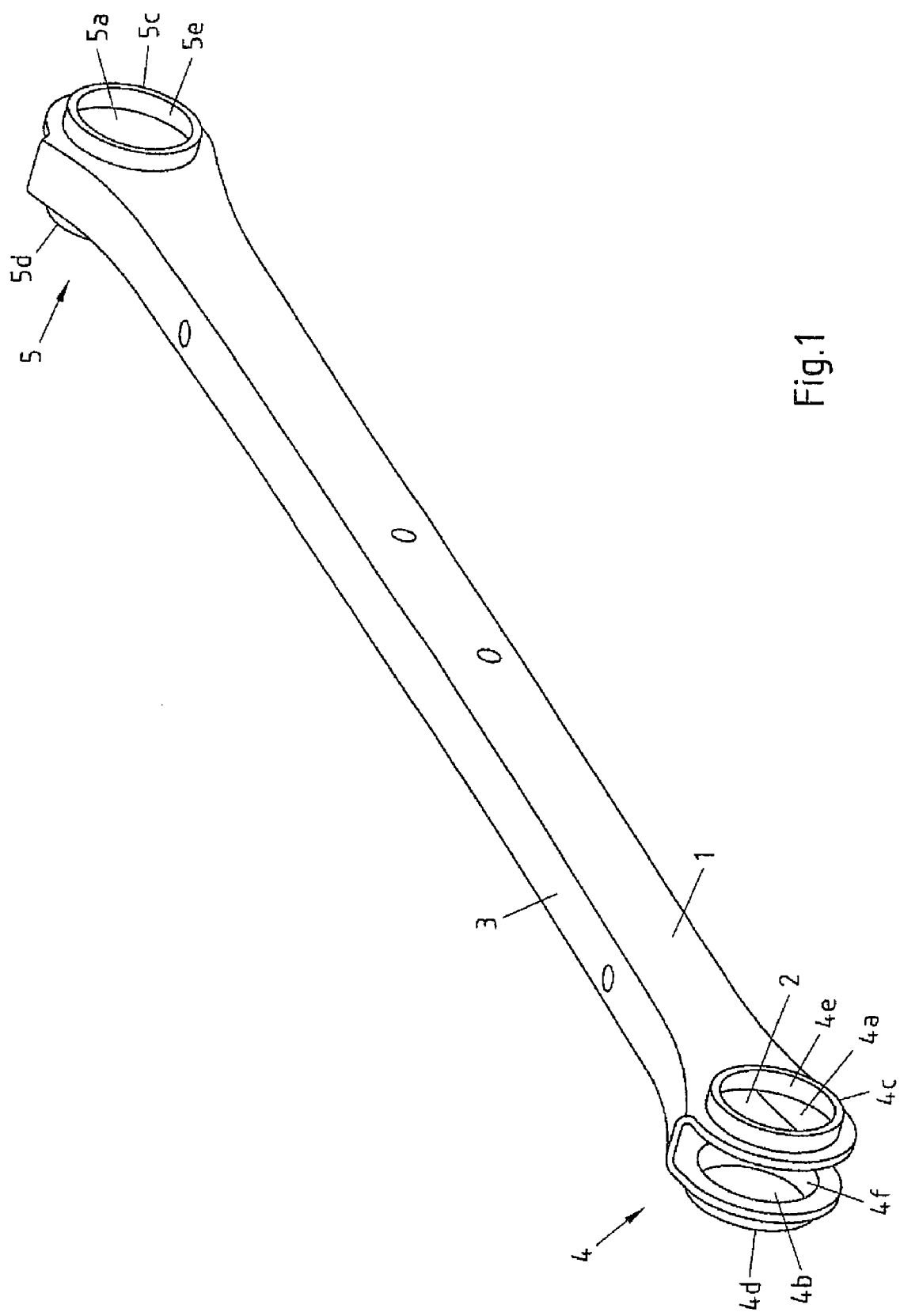
FIG. 1 shows a perspective view of an embodiment of a link rod according to the invention.

The link rod shown in FIG. 1 is formed from a one-piece sheet metal shell made of steel. It has a U-shaped cross-section. The one-piece sheet metal shell thus includes two part shells 1, 2 forming the limbs of the U-shaped profile, and a back 3 forming the connecting web of the link rods thus connecting the part shells 1, 2. At the ends of the link rod bearing eyes 4, 5 are provided. The bearing eyes 4, 5 are formed by holes 4a, 4b, 5a, 5b provided in the part shells 1, 2, the edges of which are bent outwardly thus forming outer collars 4c, 4d, 5c, 5d having inner bearing support surfaces 4e, 4f, 5e, 5f.

The link rod is of a slim design. The typical lengths are in the range of 300-500 mm. The width (the distance of the outer sides of the part shells 1, 2) is about 30-40 mm, wherein the thickness of the sheet metal made of steel is 2.0-2.5 mm.

With the exception of making the holes, the manufacture of such a link rod is performed exclusively by shaping and preferably during continuing connection to a strip drawn from a coil. The individual stages of this process are shown in FIGS. 2a-2e. With this type of manufacture, the entire manufacture is performed exclusively from one side of the strip, as is shown by arrows A indicating the working direction in the individual figures.

Figure 2A:
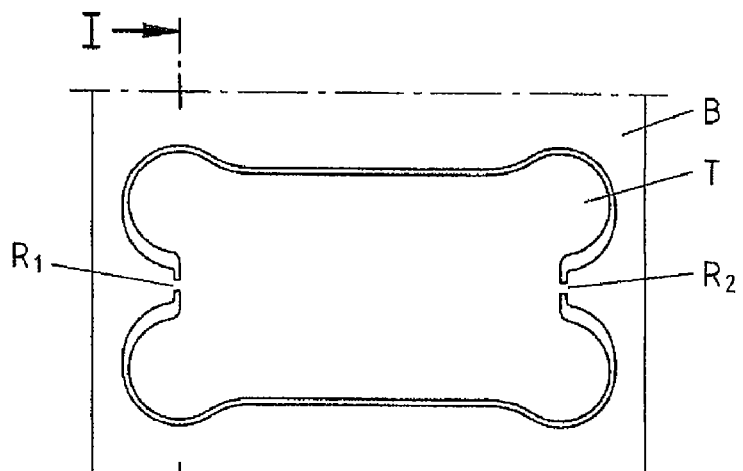
FIGS. 2a-e show a sequence of individual manufacturing stages, on the left side in plan view and on the right side in sectional view along the line I-I in the left-side view.
Figure 2A:

In the first step of FIG. 2a a sheet metal part T required for the one-piece sheet metal shell is cut out of the sheet metal strip B in such a way that it remains connected to the sheet metal strip B only at the end regions $R_1$, $R_2$ of what is to be its back 3.

Figure 2B:
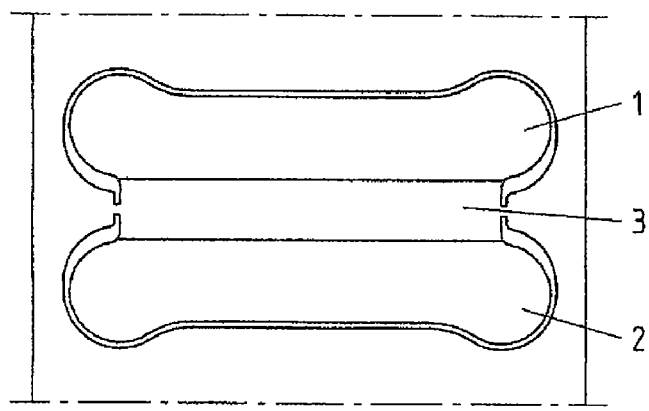
Figure 2B:
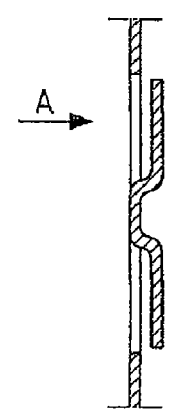

In the second manufacturing step of FIG. 2b, what is to be the back 3 is shaped. Shaping is performed by deep drawing or pressing. In doing so, either what is to be the part shells 1, 2 are dislocated from the plane of the sheet metal strip while the back 3 remains in the plane of the sheet metal strip, or the back 3 is pushed out of the plane of the sheet metal strip and the part shells 1, 2 remain in the plane of the sheet metal strip.

Figure 2C:
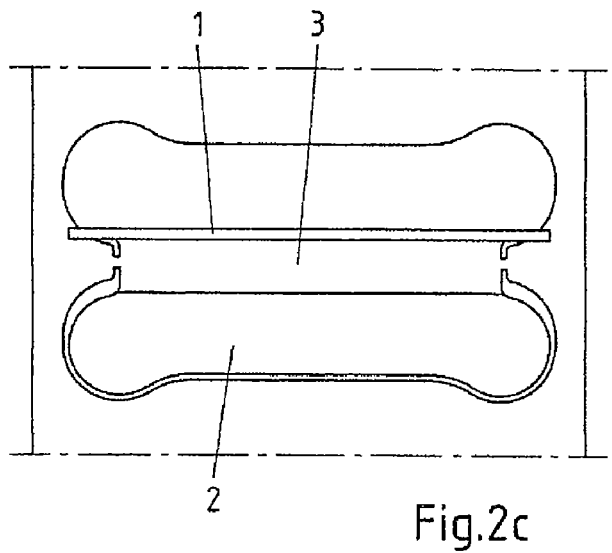
Figure 2C:
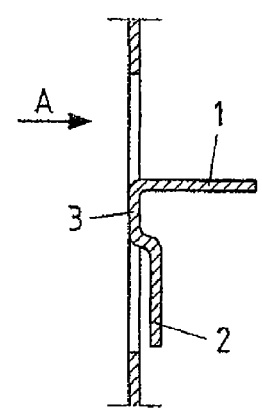
Figure 2D:
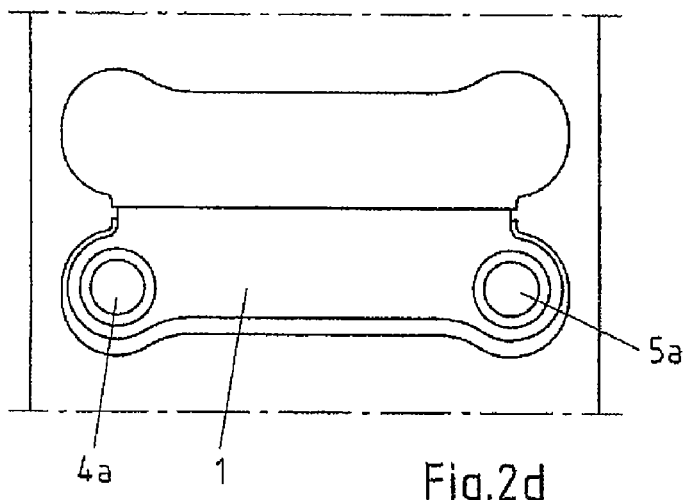
Figure 2D:
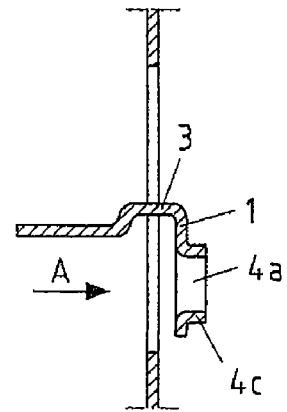

In the next manufacturing step of FIG. 2c the limb for the first part shell 1 is bent by 90° so that it merges into the adjacent edge of the back 3 in an aligned manner.

Then, in manufacturing step 2d, the entire sheet metal part T is turned by 90° while twisting the material connected at the ends $R_1$, $R_2$ of the back 3 so that the part shell 1 will come to rest parallel to the plane of the sheet metal strip or even in the plane of the sheet metal strip. In this position of the part shell 1 the holes 4a, 5a are produced and their edges bent, thus providing collars 4c, 5c having inner bearing support surfaces 4e, 5e.

Figure 2E:
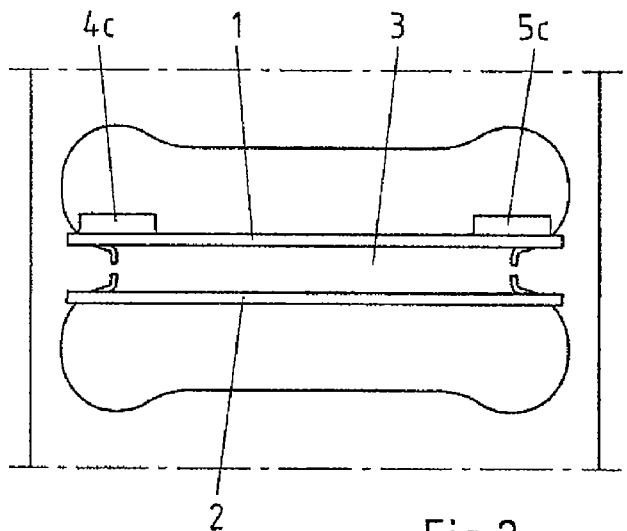
Figure 2E:
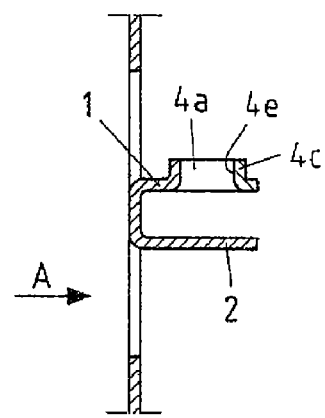

According to FIG. 2e, the entire sheet metal part T is turned back and then the limb for the second part shell 2 is bent by 90° so that it is opposed to the first part shell 1.

Figure 2F:
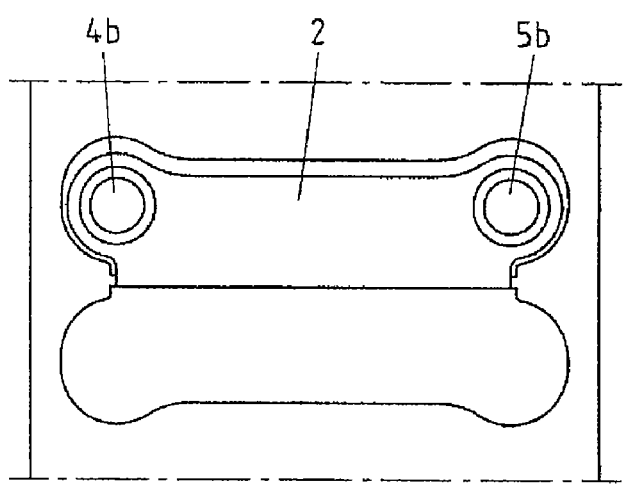
Figure 2F:
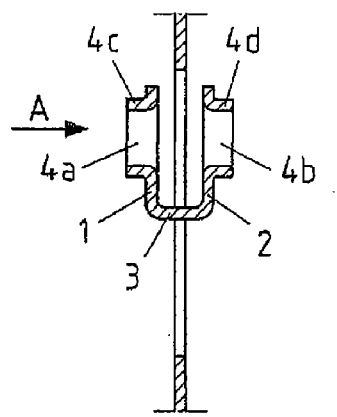

In the next manufacturing step of FIG. 2f, the entire sheet metal part T is turned by 90° while twisting the material connections at the ends $R_1$, $R_2$ of what is to become the back 3 in such a way that the first part shell 1 faces towards the working direction A. In this position the holes in the second part shell 2 are produced and their edges shaped, the required holing and shaping tools being applied from the same working direction A via the holes 4a, 5a in the first part shell 1.

In the last manufacturing step (not specifically illustrated) the entire sheet metal part T is turned back. Following calibration through the aligned edges of holes 4a, 4b, 5a, 5b and cutting the sheet metal part T at its ends $R_1$, $R_2$ off the sheet metal strip B, the link rod is finished.

The invention claimed is:

1. A method for producing a link rod with a U-shaped profile made from a one-piece sheet metal shell for a multi-link axle of a passenger car, the sheet metal shell being formed as a shaped part of two part shells in a mirror-image arrangement to each other and a back connecting said part shells and having bearing eyes at both ends thereof which are formed each by a pair of aligned holes in the part shells having collars provided at the edges of said holes and forming inner bearing support surfaces, the method comprising the following manufacturing steps:

the back of what is to become the U-shaped profile is formed in a sheet metal blank;

the first limb of what is to become the U-shaped profile is bent by 90°;

the bent first limb is holed at both ends and the edges of the holes are formed outward thus forming collars with inner bearing support surfaces;

the second limb of what is to become the U-shaped profile is bent so that it is in parallel to the first limb;

the bent second limb is holed at both ends and the edges of the holes are formed outward thus forming collars with inner bearing support surfaces, wherein the holing and forming tools required for this step pass through the holes in the first limb while being guided by them.

2. The method according to claim 1, wherein forming of the back is performed by deep drawing or pressing.

3. The method according to claim 1, wherein the link rod is calibrated after finishing the holes.

4. The method according to claim 1, wherein the different manufacturing steps are executed while the sheet metal part to be formed is continuously connected to a sheet metal strip:

the sheet metal part is cut out of the sheet metal strip at its future limbs so that only the ends of what is to be the back are connected to the sheet metal strip;

the back is formed with a U-shaped section, the limbs remaining in the plane of the sheet metal or being displaced into an orientation parallel thereto;

the first limb is bent by 90° so that it merges into the adjacent longitudinal edge of the back in an aligned manner;

the entire sheet metal part is turned by 90° in the sheet metal strip while twisting the portions connected at the ends of the back so that the bent limb is again arranged in the plane of the sheet metal strip or parallel thereto;

after holing the first limb and bending the edges of the holes, the entire sheet metal part is turned back;

the second limb is bent by 90° so that it merges into the adjacent longitudinal edge of the back in an aligned manner;

the entire sheet metal part is turned by 90° in the sheet metal strip while twisting the portions connected at the ends of the back so that both limbs are arranged parallel to the plane of the sheet metal strip;

holing of the second limb is performed and then bending of the edges of the holes via the holes in the first limb;

the edges of the holes are jointly calibrated in an aligned manner;

the sheet metal part finished as a link rod is cut from the sheet metal strip at the ends of the back.

5. The method according to claim 4, wherein the directions of rotation when turning the sheet metal part in the sheet metal strip are chosen such that the working direction is the same for all forming processes.

* * * * *